(12) United States Patent
Yang et al.

(10) Patent No.: US 11,411,614 B1
(45) Date of Patent: Aug. 9, 2022

(54) ANTENNA FOR RADIATING DUAL BEAM AND THIRD BEAM

(71) Applicants: ROSENBERGER TECHNOLOGIES CO., LTD., Suzhou (CN); ROSENBERGER TECHNOLOGIES LLC, Budd Lake, NJ (US)

(72) Inventors: Zhongcao Yang, Suzhou (CN); Huirong Gu, Suzhou (CN); Guoqun Chen, Suzhou (CN)

(73) Assignees: ROSENBERGER TECHNOLOGIES CO., LTD., Suzhou (CN); ROSENBERGER TECHNOLOGIES LLC, Budd Lake, NJ (US)

( * ) Notice: Subject to any disclaimer, the term of this patent is extended or adjusted under 35 U.S.C. 154(b) by 0 days.

(21) Appl. No.: 17/386,890

(22) Filed: Jul. 28, 2021

(30) Foreign Application Priority Data

Mar. 15, 2021 (CN) .......................... 202110276750.1

(51) Int. Cl.
*H04B 7/0408* (2017.01)
*H01Q 21/08* (2006.01)
*H04B 7/06* (2006.01)

(52) U.S. Cl.
CPC .......... *H04B 7/0408* (2013.01); *H01Q 21/08* (2013.01); *H04B 7/0617* (2013.01)

(58) Field of Classification Search
CPC ...... H04B 7/0617; H04B 7/0408; H04B 7/02; H04B 7/0404; H04B 7/06; H01Q 21/08; H01Q 21/0087; H01Q 21/22; H01Q 21/00
USPC ......................................................... 375/267
See application file for complete search history.

(56) References Cited

U.S. PATENT DOCUMENTS

| | | | | |
|---|---|---|---|---|
| 2003/0146880 A1* | 8/2003 | Chiang | ................ | H04B 7/0617 343/853 |
| 2009/0280867 A1* | 11/2009 | Hovers | .................. | H04B 7/088 455/562.1 |
| 2013/0070677 A1* | 3/2013 | Chang | .................. | H04B 7/2041 370/328 |
| 2019/0379446 A1* | 12/2019 | Rothaar | ............. | H04B 7/18517 |
| 2020/0212566 A1* | 7/2020 | Tsai | .......................... | H01P 1/18 |

* cited by examiner

*Primary Examiner* — Leila Malek
(74) *Attorney, Agent, or Firm* — Anova Law Group, PLLC

(57) ABSTRACT

An antenna includes an antenna element array configured to form a dual beam and including at least three antenna elements and a feed network including a first signal input terminal configured to input a first beam signal for forming a first beam, a second signal input terminal configured to input a second beam signal for forming a second beam, a third signal input terminal configured to input a third beam signal for forming a third beam, and a diplexer including a first input terminal, a second input terminal, and an output terminal. The diplexer is electrically connected to at least one antenna element in the antenna element array through the output terminal and configured to process a signal associated with a dual-beam signal and a signal associated with the third beam signal working in a different frequency band from the dual-beam signal, to obtain a combined signal.

17 Claims, 7 Drawing Sheets

… (1)

ANTENNA FOR RADIATING DUAL BEAM AND THIRD BEAM

CROSS-REFERENCE TO RELATED APPLICATION

This application claims priority to Chinese Patent Application No. 202110276750.1, filed on Mar. 15, 2021, the entire contents of which are incorporated herein by reference.

TECHNICAL FIELD

The present disclosure relates to the field of communications and, in particular, to an antenna for radiating a dual beam and a third beam, such as a 65° beam.

BACKGROUND

Mobile communication technology continues to develop rapidly, and mobile communication networks are continuously upgraded. Base station antennas are key devices of the mobile communication network. Performance indicators and practical functions of the base station antennas are improved continuously. Multi-band base station antennas for a hybrid network enable multiple antenna element arrays in a single radome to work in multiple frequency bands and support multiple network systems simultaneously, thereby reducing a total number of antennas in the network, reducing a building cost of base stations, and alleviating resource conflicts of the antenna base stations.

For a hybrid antenna that can radiate a dual beam and a 65° beam, a dual-beam part and a 65° beam part have corresponding antenna element arrays, respectively, which cause the antenna element arrays to be relatively large and expensive.

SUMMARY

In accordance with the disclosure, there is provided an antenna including an antenna element array configured to form a dual beam and including at least three antenna elements, and a feed network including a first signal input terminal configured to input a first beam signal for forming a first beam, a second signal input terminal configured to input a second beam signal for forming a second beam, a third signal input terminal configured to input a third beam signal for forming a third beam, and a diplexer including a first input terminal, a second input terminal, and an output terminal. The diplexer is electrically connected to at least one of the at least three antenna elements through the output terminal, and is configured to process a signal associated with a dual-beam signal and a signal associated with the third beam signal working in a different frequency band from the dual-beam signal, to obtain a combined signal, and to enable at least one antenna element electrically connected to the first diplexer to radiate the combined signal. The dual-beam signal includes the first beam signal and/or the second beam signal. The combined signal includes a first signal component associated with the dual-beam signal and a second signal component associated with the third beam signal.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Figure 1:
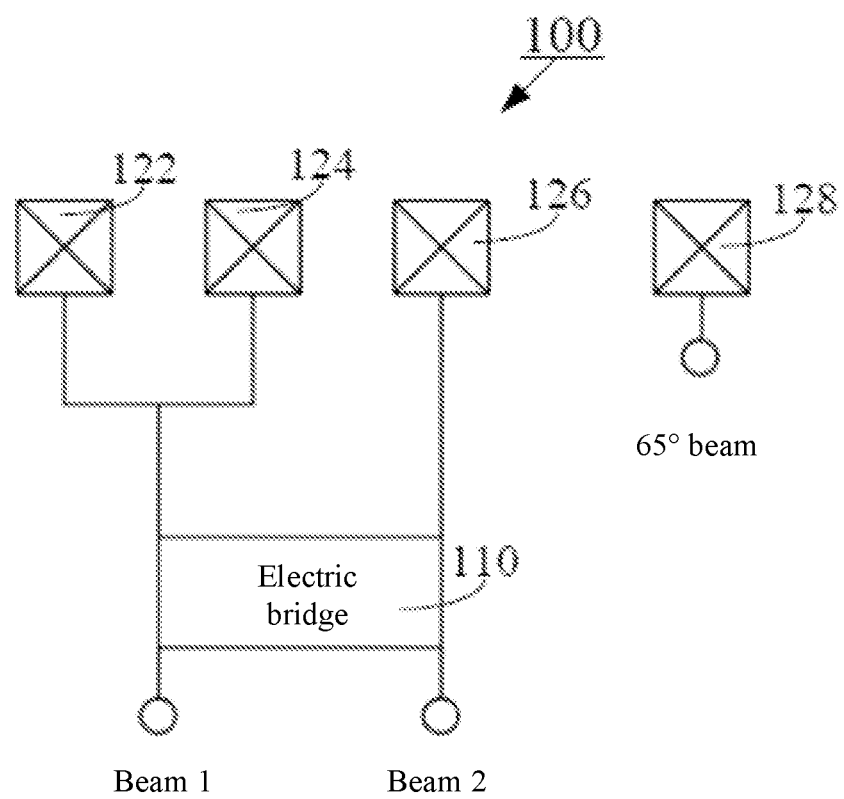
FIG. 1 is a schematic diagram of an antenna 100 for radiating a dual beam and a 65° beam implemented by the Butler matrix principle in the existing technology.

FIG. 1 is a schematic diagram of an antenna 100 for radiating a dual beam and a 65° beam implemented by the Butler matrix principle in the existing technology. As shown in FIG. 1, the traditional dual-beam antenna 100 implemented by the Butler matrix principle uses a 3 dB electric bridge 110 to achieve a dual beam. Specifically, a feed network of the traditional dual-beam antenna 100 includes a 3 dB electric bridge 110. Signals used to form beam 1 and beam 2 are input to two input terminals of the 3 dB electric bridge 110, respectively. After the signals used to form beam 1 and beam 2 are processed by the 3 dB electric bridge 110, a corresponding electrical signal is formed at an output terminal of the 3 dB electric bridge 110. The corresponding electrical signal is output to antenna elements 122, 124, and 126. The antenna element, as used herein, may refer to an antenna radiator. The antenna elements 122, 124, and 126 radiate beam 1 and beam 2. When a third beam needs to be radiated, an additional antenna element (for example, antenna element 128) is needed. In the example shown in FIG. 1, the antenna element 128 is used to radiate a third beam, such as a 65° beam. Because the additional antenna element 128 is needed to radiate the third beam, such as a 65° beam, in the existing technology, a cost and a product size of the antenna 100 are increased.

To solve such problem in the existing technology, a new antenna consistent with the present disclosure is provided. For example, the disclosed antenna uses a novel feed network including a diplexer to radiate one or more third beams (such as 65° beams) without adding an additional antenna element, which can reduce one or more columns of antenna elements, thereby greatly reducing the size and the cost of the antenna.

Figure 2:
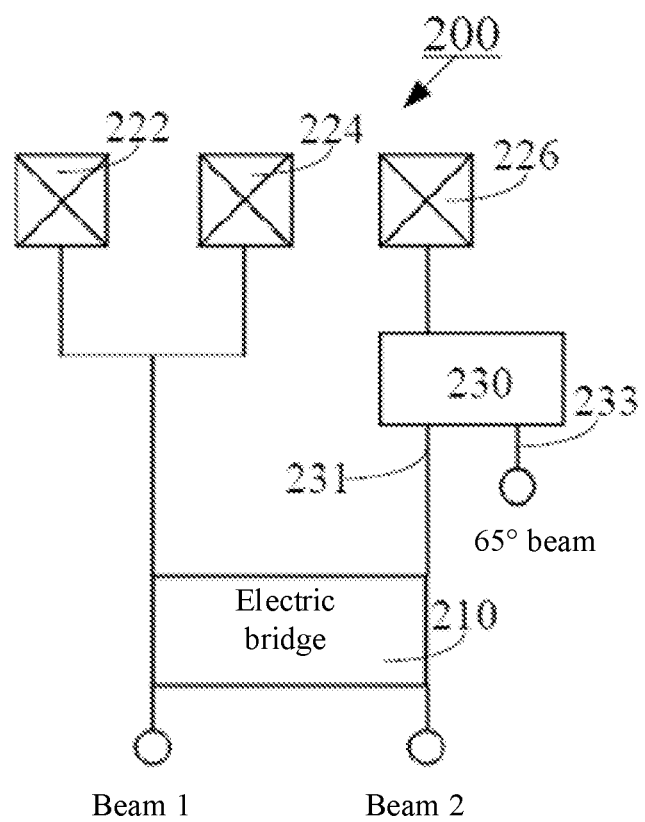
FIG. 2 is a schematic diagram of an antenna 200 for radiating a dual beam and a third beam according to an example embodiment of the present disclosure.

FIG. 2 is a schematic diagram of an antenna 200 for radiating a dual beam and a third beam (such as a 65° beam) according to an example embodiment of the present disclosure. As shown in FIG. 2, the antenna 200 includes an antenna element array for forming a dual beam and a feed network electrically connected to the antenna element array. The antenna element array for forming a dual beam includes at least three antenna element 222, 224, and 226. The feed network has a first signal input terminal (i.e., a terminal corresponding to beam 1 shown in FIG. 2) and a second signal input terminal (i.e., a terminal corresponding to beam 2 shown in FIG. 2). In addition, the feed network also includes a diplexer 230, which includes a first input terminal 231, a second input terminal 233, and an output terminal (i.e., a terminal of the diplexer 230 connected to the antenna element 226 shown in FIG. 2). The second input terminal 233 of the diplexer 230 is a third signal input terminal of the feed network (i.e., a terminal corresponding to 65° beam in FIG. 2). The diplexer 230 is electrically connected to at least one of the at least three antenna elements 222, 224, and 226 (e.g., the antenna element 226 shown in FIG. 2) through the output terminal. The diplexer 230 is configured to process a signal associated with a dual-beam signal (i.e., a signal obtained after signals used to form beam 1 and beam 2 are processed by an electric bridge 210 shown in FIG. 2) and a signal associated with a third beam signal (i.e., a signal used to form the 65° beam shown in FIG. 2) that works in a different frequency band from the dual-beam signal, to obtain a combined signal including a first signal component associated with the dual-beam signal and a second signal component associated with the third beam signal. The combined signal is output to the at least one antenna element (e.g., the antenna element 226 shown in FIG. 2) electrically connected to the diplexer 230 through the output terminal of the diplexer. The at least one antenna element (e.g., the antenna element 226 shown in FIG. 2) can radiate both a dual beam and a third beam, such as a 65° beam, thereby reducing the number of antenna elements and reducing the cost of the antenna elements. With the aid of the diplexer 230, the combined signal including the first signal component associated with the dual-beam signal (i.e., the signal used to form beam 1 and beam 2 shown in FIG. 2) and the second signal component associated with the third beam signal (i.e., the signal used to form the 65° beam shown in FIG. 2) can be radiated through, for example, a same antenna element, thereby realizing multiplexing of the antenna element. Those skilled in the art should understand that the at least three antenna elements can be arranged in one or more rows.

In an example embodiment of the present disclosure, as shown in FIG. 2, the third beam signal is the signal used to form the 65° beam. The third beam signal is, for example, a signal used to form a 65° beam. However, those skilled in the art should understand that the signal used to form a 65° beam here is only exemplary and not restrictive. The third beam signal may include other signals used to form 55°-75° beams, which work in a different frequency band from the dual-beam signal (the signal used to form the dual beam). In an example embodiment of the present disclosure, the dual-beam signal includes a first beam signal (i.e., the signal used to form beam 1 shown in FIG. 2) and a second beam signal (i.e., the signal used to form beam 2 in FIG. 2). As a result, the antenna can simultaneously radiate a first beam, a second beam, and the third beam.

In an example embodiment, the feed network of the antenna includes the electric bridge 210. The diplexer 230 is arranged between the electric bridge 210 and the at least one antenna element 226. The electric bridge 210 is one of possible implementation forms for realizing a dual beam, other circuit forms capable of realizing a dual beam are also included in the protection scope of the corresponding claims of this application. Those skilled in the art should understand that the electric bridge 210 can include, for example, a Butler bridge, or another type of other electric bridges that can be used for dual-beam antennas.

Figure 3:
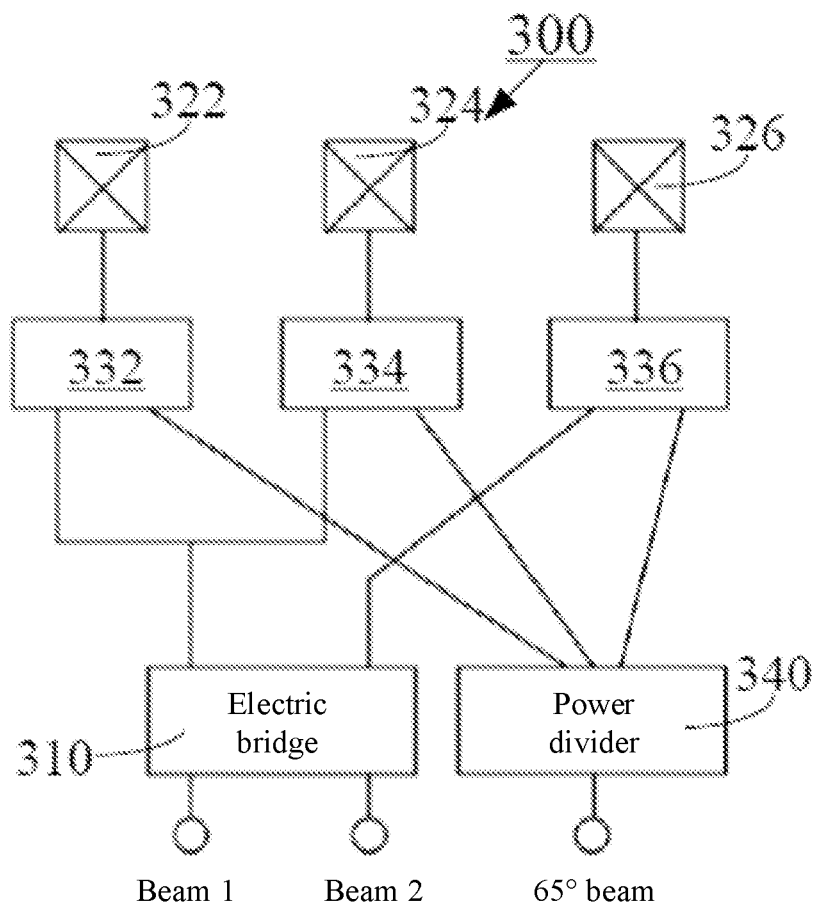
FIG. 3 is a schematic diagram of an antenna 300 for radiating a dual beam and a third beam according to an example embodiment of the present disclosure.

In some embodiments, the signal used to form the third beam can be radiated by multiplexing multiple antenna elements. In an example embodiment of the present disclosure, the feed network of the antenna further includes a power divider 340. FIG. 3 is a schematic diagram of an antenna 300 for radiating a dual beam and a third beam according to an example embodiment of the present disclosure. As shown in FIG. 3, the antenna 300 includes an antenna element array for forming a dual beam and a feed network electrically connected to the antenna element array. The antenna element array for forming a dual beam includes at least three antenna elements 322, 324, and 326. The feed network has a first signal input terminal (i.e., the terminal corresponding to beam 1 shown in FIG. 3), a second signal input terminal (i.e., the terminal corresponding to beam 2 shown in FIG. 3), and a third signal input terminal (e.g., the terminal corresponding to 65° beam shown in FIG. 3). In addition, the feed network also includes three diplexers 332, 334, and 336. Each of the three diplexers 332, 334, and 336 includes a first input terminal, a second input terminal, and an output terminal (a terminal of each of the diplexers connected to a corresponding antenna element shown in FIG. 3). The three diplexers 332, 334, and 336 are electrically connected to the corresponding one of the at least three antenna elements 322, 324, and 326 (e.g., the antenna elements 322, 324, and 326 shown in FIG. 3) through the output terminals, respectively. The three diplexers 332, 334, and 336 are respectively configured to process a signal associated with a dual-beam signal (i.e., a signal used to form beam 1 and beam 2 as shown in FIG. 3) and a signal associated with a third beam signal (i.e., a signal used to form the 65° beam shown in FIG. 3) that works in a different frequency band from the dual-beam signal to obtain a combined signal including a first signal component associated with the dual-beam signal and a second signal component associated with the third beam signal. The combined signals are output to the corresponding antenna elements (e.g., the antenna elements 322, 324, and 326 shown in FIG. 3) electrically connected to the three diplexers 332, 334, and 336 through the output terminals of the three diplexers 332, 334, and 336, respectively. The three antenna elements (e.g., the antenna elements 322, 324, and 326 shown in FIG. 3) can radiate both a dual beam and a third beam, such as a 65° beam, thereby reducing the number of antenna elements and reducing the cost of the antenna elements. With the aid of the three diplexers 332, 334, and 336, the combined signal includes the first signal component associated with the dual-beam signal (i.e., the signal used to form beam 1 and beam 2 shown in FIG. 3) and the second signal component associated with the third beam signal (i.e., the signal used to form the 65° beam shown in FIG. 3) can be radiated through, for example, a same antenna element, thereby realizing multiplexing of the antenna elements. Those skilled in the art should understand that the at least three antenna elements can be arranged in one or more rows. A difference between FIG. 2 and FIG. 3 is that the feed network shown in FIG. 3 also includes the power divider 340. An input terminal of the power divider 340 is the third signal input terminal of the feed network. The third beam signal (i.e., the signal used to form the 65° beam in FIG. 3), is input through the input terminal of the power divider 340. An output terminal of the power divider 340 is connected to the first input terminals (the input terminals on a right side of each diplexer shown in FIG. 3) of the three diplexers 332, 334, and 336. In an example embodiment of the present disclosure, the three diplexers 332, 334, and 336 are arranged between the electric bridge 310 and the three antenna elements 322, 324, and 326.

Figure 4:
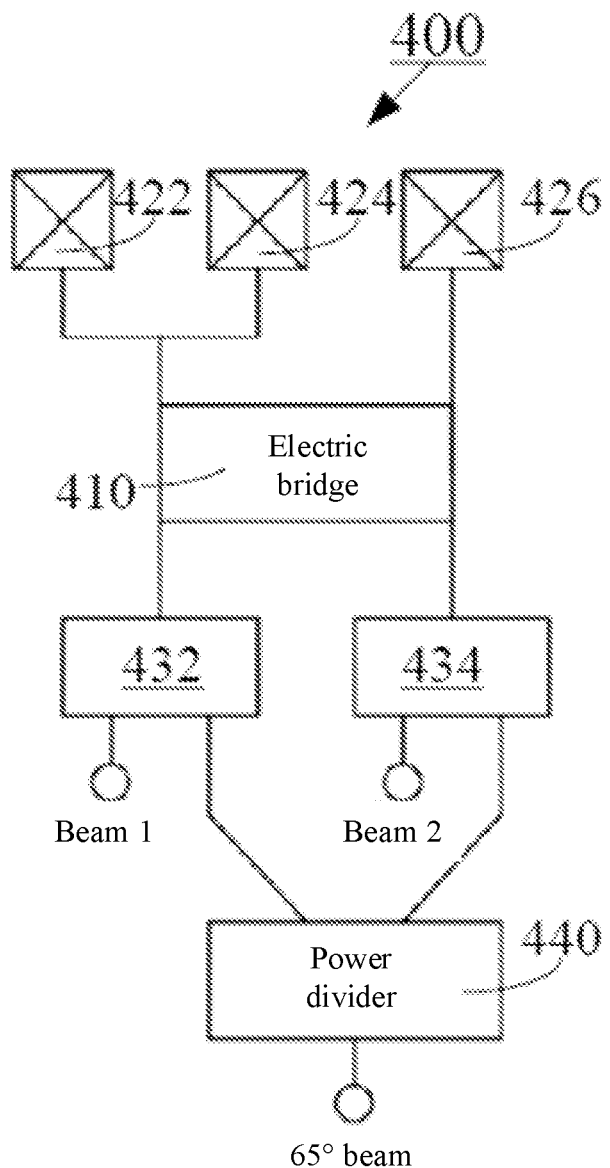
FIG. 4 is a schematic diagram of an antenna 400 for radiating a dual beam and a third beam according to an example embodiment of the present disclosure.

In some embodiments, the diplexer may be connected to a front stage of the electric bridge rather than being connected between the electric bridge and the antenna element. FIG. 4 is a schematic diagram of an antenna 400 for radiating a dual beam and a third beam according to an example embodiment of the present disclosure. As shown in FIG. 4, the antenna 400 includes an antenna element array for forming a dual beam and a feed network electrically connected to the antenna element array. The antenna element array for forming a dual beam includes at least three antenna elements 422, 424, and 426. The feed network has a first signal input terminal (e.g., the terminal corresponding to beam 1 shown in FIG. 4), a second signal input terminal (i.e., the terminal corresponding to beam 2 shown in FIG. 4), and a third signal input terminal (e.g., the terminal corresponding to the 65° beam shown in FIG. 4). In addition, the feed network also includes two diplexers 432 and 434. Each of the two diplexers 432 and 434 includes a first input terminal, a second input terminal, and an output terminal (a terminal of each of the diplexers connected to a corresponding input terminal of an electric bridge 410). The two diplexers 432 and 434 are electrically connected to the corresponding input terminal of the electric bridge 410 through the output terminal, respectively. The diplexer 432 is configured to process a signal used to form the beam 1 and a signal associated with a third beam signal (i.e., a signal used to form the 65° beam shown in FIG. 4) to obtain a first combined signal including a first signal component associated with the signal used to form beam 1 and a second signal component associated with the third beam signal. The diplexer 434 is configured to process a signal used to form beam 2 and the signal associated with the third beam signal (i.e., the signal used to form the 65° beam shown in FIG. 4) to obtain a second combined signal including a third signal component associated with the signal used to form beam 2 and a fourth signal component associated with the third beam signal. The first combined signal and the second combined signal are input through the two input terminals of the electric bridge 410, respectively. The first combined signal and the second combined signal are processed by the electric bridge 410. A corresponding electrical signal is formed at the output terminal of the electric bridge 410. The corresponding electrical signal is output to the antenna elements (e.g., the antenna elements 422, 424, and 426 shown in FIG. 4) electrically connected to the electric bridge 410. The three antenna elements (e.g., the antenna elements 422, 424, and 426 shown in FIG. 4) can radiate both a dual beam and a third beam, such as a 65° beam, thereby reducing the number of antenna elements and the cost of the antenna elements. With the aid of the feed network including the two diplexers 432 and 434, the electric bridge 410, and the power divider 440, the dual-beam signal (i.e., the signal used to form beam 1 and beam 2 shown in FIG. 4) and the third beam signal (i.e., the signal used to form the 65° beam shown in FIG. 4) can be radiated through, for example, a same antenna element, thereby realizing the multiplexing of the antenna element. Those skilled in the art should understand that the at least three antenna elements can be arranged in one or more rows. A difference between FIG. 2 and FIG. 4 is that the antenna 400 shown in FIG. 4 further includes the power divider 440. The third beam signal (i.e., the signal used to form 65° beam shown in FIG. 4) is input through an input terminal of the power divider 440. An output terminal of the power divider 440 is connected to the first input terminals (the input terminals on a right side of each diplexer shown in FIG. 4) of the two diplexers 432 and 434. In an example embodiment of the present disclosure, the two diplexers 432 and 434 are arranged between the electric bridge 410 and the power divider 440. In addition, in the example shown in FIG. 4, the signal used to form beam 1 and the signal used to form beam 2 are input through the second input terminals (the input terminals on a left side of each diplexer shown in FIG. 4, that is, the first signal input terminal and the second signal input terminal of the feed network) of the two diplexers 432 and 434, respectively. The output terminals of the two diplexers 432 and 434 are connected to the two input terminals of the electric bridge 410, respectively.

Figure 5:
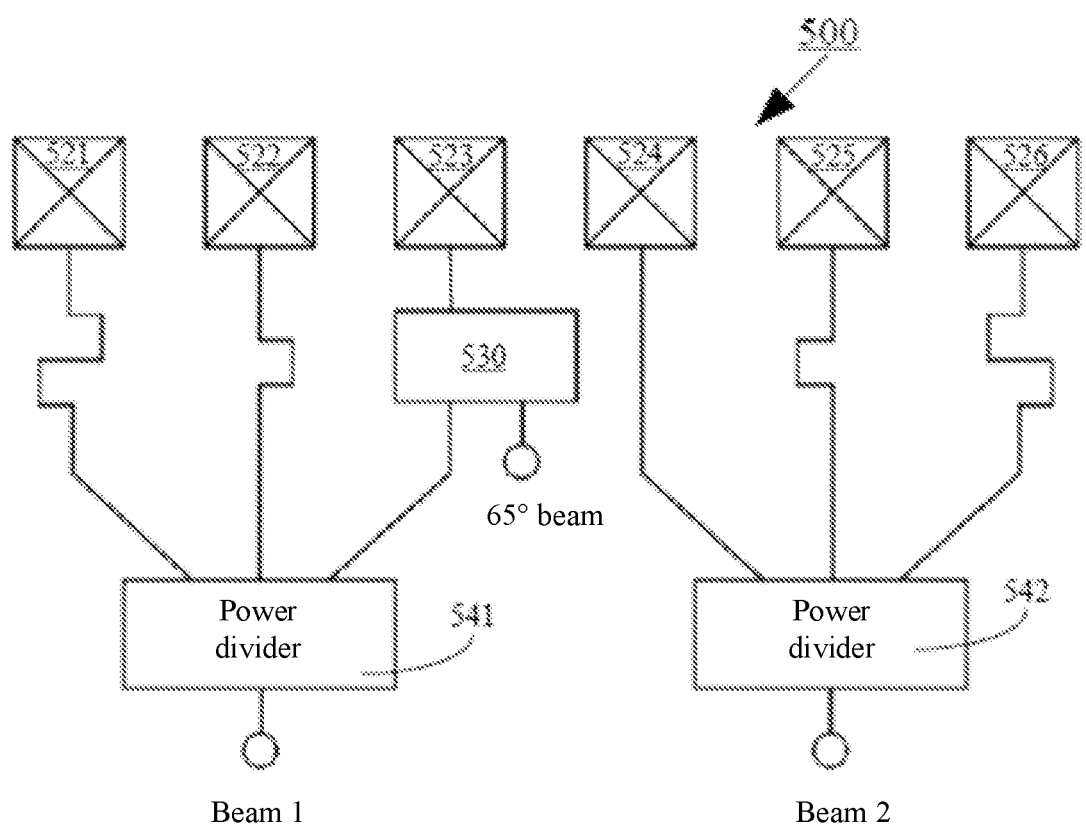
FIG. 5 is a schematic diagram of an antenna 500 for radiating a dual beam and a third beam according to an example embodiment of the present disclosure.

In some embodiments, a dual beam can be realized not only by the principle of Butler matrix, but also by means of a phase difference between the antenna elements. For example, FIG. 5 is a schematic diagram of an antenna 500 for radiating a dual beam and a third beam according to an example embodiment of the present disclosure. As shown in FIG. 5, the antenna element array includes a first antenna element group. The first antenna element group includes at least three first antenna elements 521, 522, and 523 arranged in a row. In addition, the antenna element array also includes a second antenna element group. The second antenna element group includes at least three second antenna elements 524, 525, and 526 arranged in a row. The antenna elements in the first antenna element group and the second antenna element group are independent from each other. In some embodiments, the antenna elements in the first antenna element group are independent from each other, the antenna elements in the second antenna element group are independent from each other. In some embodiments, the first antenna element group and the second antenna element group are independent from each other. In addition, the antenna 500 also includes a first feed network and a second feed network that are independent from each other. The first feed network on a left side includes a first power divider 541, a diplexer 530, and a first cable group used to electrically connect the first power divider 541 to each of the first antenna elements 521, 522, and 523 of the first antenna element group or the diplexer 530. An internal structure of the first power divider 541 and/or a length of each cable of the first cable group is configured to adjust a phase of a signal used to form a first beam and received by each of the first antenna elements in each of the first antenna elements. The second feed network on a right side includes a second power divider 542 and a second cable group used to electrically connect the second power divider 541 to each of the second antenna elements 524, 525, and 526 of the second antenna element group. An internal structure of the second power divider 542 and/or the length of each cable of the second cable group is configured to adjust a phase of a signal used to form a second beam and received by each of the second antenna elements in each of the second antenna elements. As shown in FIG. 5, each cable group basically includes three cables. Those skilled in the art should understand that other numbers of cables may also be used.

Figure 6:
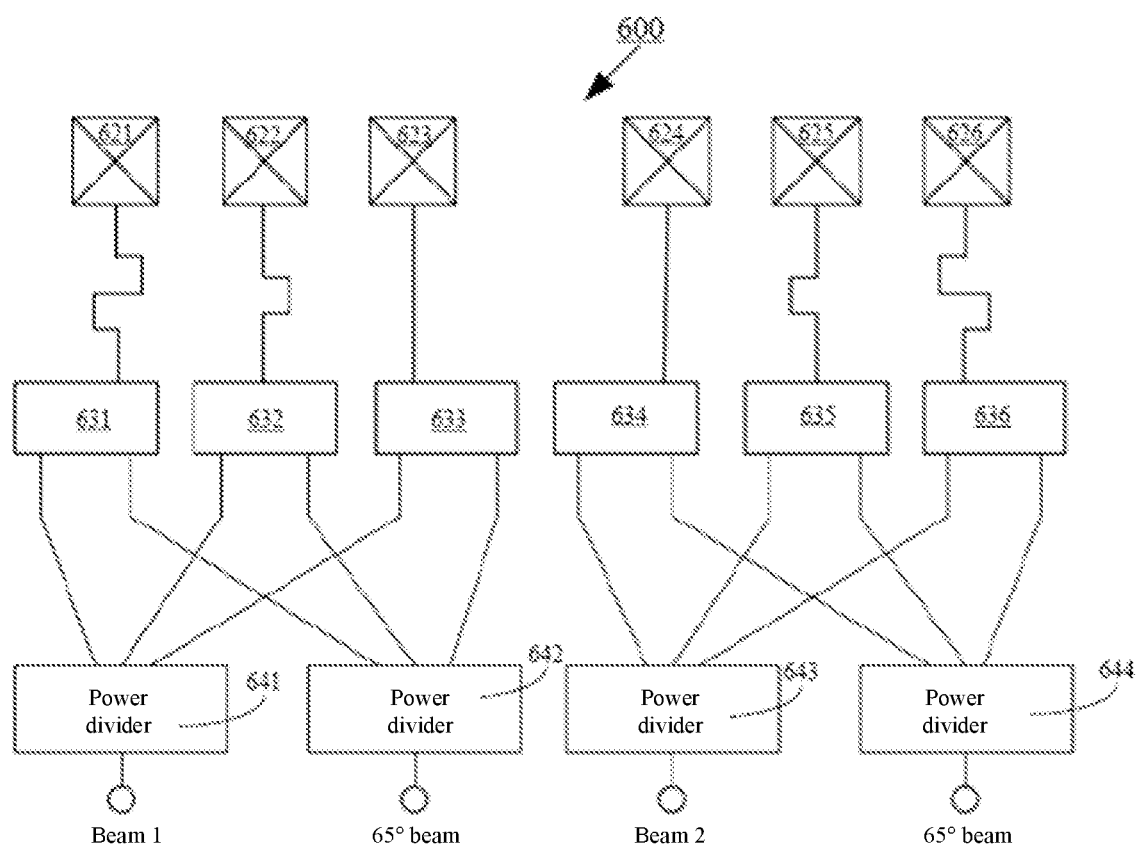
FIG. 6 is a schematic diagram of an antenna 600 for radiating a dual beam and a third beam according to an example embodiment of the present disclosure.
Figure 7:
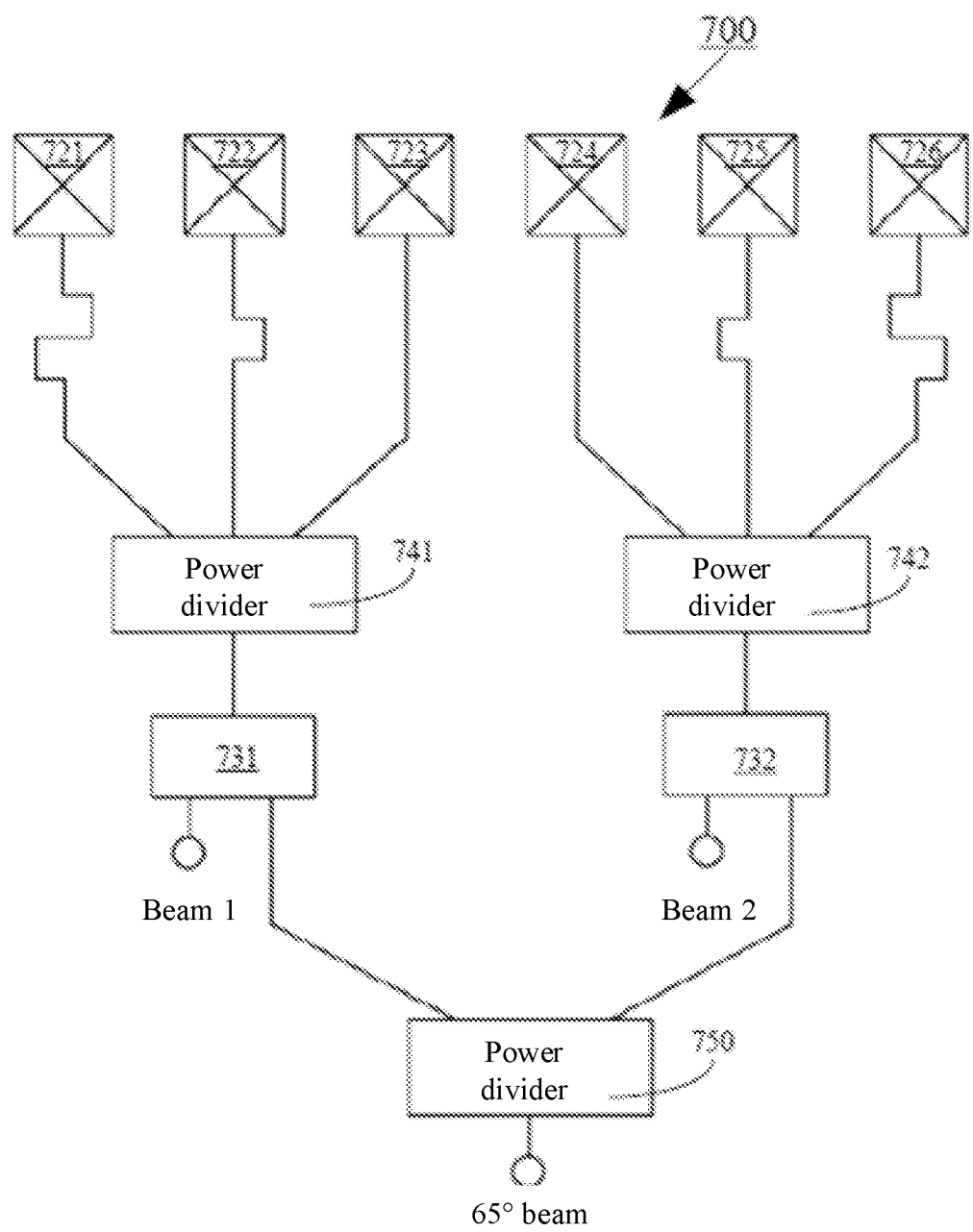
FIG. 7 is a schematic diagram of an antenna 700 for radiating a dual beam and a third beam according to an example embodiment of the present disclosure.

A phase difference of the adjacent two of the at least three first antenna elements 521, 522, and 523 is a first angle. A phase difference of the adjacent two of the at least three second antenna elements 524, 525, and 526 is a second angle. In an example embodiment of the present disclosure, the length of each cable of the first cable group and/or the internal structure of the first power divider 541 is associated with the first angle $\Delta P$. The length of each cable of the second cable group and/or the internal structure of the second power divider 542 is also associated with the second angle ΔP. Phases of the antenna elements 521, 522, and 523 are, for example, −2ΔP, −1ΔP, and 0ΔP, respectively. Phases of the antenna elements 524, 525, and 526 are, for example, 0 degree, −ΔP, and −2ΔP, respectively. In an example embodiment of the present disclosure, the first angle or the second angle is in a range of 0 degree to 150 degrees. In an example embodiment of the present disclosure, the first angle or the second angle is 90 degrees. The implementation principle of the dual beam in the embodiments shown in FIG. 6 and FIG. 7 is the same as that in the example embodiment shown in FIG. 5.

Similar to the principle of FIG. 2 above, in order to radiate a third beam, such as a 65° beam, the first feed network on the left side of the antenna 500 includes the diplexer 530, which includes a first input terminal, a second input terminal, and an output terminal (a terminal of the diplexer 530 connected to the antenna element 523 shown in FIG. 5). The diplexer 530 is electrically connected to at least one of the at least three antenna elements 521, 522, and 523 (e.g., the antenna element 523 shown in FIG. 5) through the output terminal. The diplexer 530 is configured to process a signal associated with the beam 1 shown in FIG. 5 and a signal associated with a third beam signal (the signal used to form 65° beam shown in FIG. 5) that works in a different frequency band from a dual-beam signal to obtain a combined signal including a first signal component associated with the signal forming beam 1 and a second signal component associated with the third beam signal. Therefore, the at least one antenna element (e.g., the antenna element 523 shown in FIG. 5) electrically connected to the diplexer 530 can radiate both beam 1 of the dual beam and the third beam, such as the 65° beam, while the antenna element on the right side (e.g., antenna elements 524, 525, and 526) can radiate beam 2 of the dual beam, thereby reducing the number of antenna elements and reducing the cost of the antenna elements. With the aid of the diplexer 530, the combined signal including the first signal component associated with the dual-beam signal (i.e., the signal used to form beam 1 shown in FIG. 5) and the second signal component associated with the third beam signal (i.e., the signal used to form the 65° beam shown in FIG. 5) can be radiated through, for example, a same antenna element, thereby realizing the multiplexing of the antenna element, that is, the antenna element 523 can radiate both beam 1 of the dual beam and the third beam, such as the 65° beam, while the antenna element on the right side (e.g., antenna elements 524, 525, and 526) can radiate beam 2 of the double beam, thereby reducing the number of antenna elements and reducing the cost of antenna elements. Those skilled in the art should understand that the at least three antenna elements can be arranged in one or more rows.

Similar to the principle of FIG. 3 above, in order to enable multiple antenna elements to be multiplexed, multiple diplexers can also be used. FIG. 6 is a schematic diagram of an antenna 600 for radiating a dual beam and a third beam according to an example embodiment of the present disclosure. As shown in FIG. 6, the antenna 600 includes an antenna element array for forming a dual beam. The antenna element array includes six antenna elements 621, 622, 623, 624, 625, and 626. A feed network of the antenna 600 has a first signal input terminal (i.e., the terminal corresponding to beam 1 shown in FIG. 6), a second signal input terminal (i.e., the terminal corresponding to beam 2 shown in FIG. 6), and a third and a fourth signal input terminals (i.e., the two terminals corresponding to the 65° beams shown in FIG. 6).

A phase difference of the adjacent two of the at least three first antenna elements 621, 622, and 623 is a first angle. A phase difference of the adjacent two of the at least three second antenna elements 624, 625, and 626 is a second angle. In an example embodiment of the present disclosure, a length of cables between a power divider 641 included in the feed network and each of the first antenna elements 621, 622, and 623 of the first antenna element group and/or an internal structure of the power divider 641 is associated with the first angle ΔP. The length of cables between a power divider 643 included in the feed network and each of the second antenna elements 624, 625, and 626 of the second antenna element group and/or the internal structure of the power divider 643 is also related to the second angle ΔP. Phases of the antenna elements 621, 622, and 623 are, for example, −2ΔP, −1ΔP, and 0ΔP, respectively. Phases of the antenna elements 624, 625, and 626 are, for example, 0 degree, −ΔP, and −2ΔP, respectively. In an example embodiment of the present disclosure, the first angle or the second angle is in a range of 0 degree to 150 degrees. In an example embodiment of the present disclosure, the first angle or the second angle is 90 degrees.

In addition, the antenna 600 also includes six diplexers 631, 632, 633, 634, 635, and 636. Each of the six diplexers 631, 632, 633, 634, 635, and 636 includes a first input terminal, a second input terminal, and an output terminal (a terminal of each of the diplexer connected to a corresponding antenna element of the antenna elements 621, 622, 623, 624, 625, and 626 shown in FIG. 6). The six diplexers 631, 632, 633, 634, 635, and 636 are electrically connected to the corresponding antenna element of the six antenna elements 621, 622, 623, 624, 625, and 626 through the output terminals, respectively. The three diplexers 631, 632, and 633 of the six diplexers 631, 632, 633, 634, 635, and 636 on a left side are configured to process a signal associated with a signal used to form beam 1 of a dual-beam signal and a signal associated with a third beam signal (i.e., a signal used to form 65° beam shown in FIG. 6) that works in a different frequency band from the dual-beam signal, to obtain a first combined signal including a first signal component associated with the signal used to form beam 1 of the dual-beam signal and a second signal component associated with the third beam signal. Thus, the first combined signal can be radiated by one of the corresponding antenna elements (e.g., the three antenna elements 621, 622, and 623 on the left side of the six antenna elements 621, 622, 623, 624, 625, and 626 shown in FIG. 6) electrically connected to the three diplexers 631, 632, and 633 on the left side of the six diplexers 631, 632, 633, 634, 635, and 636. In a same way, the three diplexers 634, 635, and 636 on the right side of the six diplexers 631, 632, 633, 634, 635, and 636 are configured to process a signal associated to a signal used to form beam 2 of the dual beam signal and a signal associated with the third beam signal (i.e., the signal used to form the 65° beam shown in FIG. 6) that works in the different frequency band from the dual-beam signal, to obtain a second combined signal including a third signal component associated with the signal used to form beam 2 of the dual-beam signal and a fourth signal component associated with the third beam signal. Thus, the second combined signal can be radiated by one of the corresponding antenna elements (e.g., the three antenna elements 624, 625, and 626 on the right side of the six antenna elements 621, 622, 623, 624, 625, and 626 shown in FIG. 6) electrically connected to the three diplexers 634, 635, and 636 on the right side of the diplexers 631, 632, 633, 634, 635, and 636.

With the aid of the six diplexers 631, 632, 633, 634, 635, and 636, the signal components associated with the dual-beam signal (i.e., the signal used to form beam 1 or beam 2 shown in FIG. 6) and the signal components associated with the third beam signal (i.e., the signal used to form the 65° beam shown in FIG. 6) can be radiated through, for example, a same antenna element, thereby realizing the multiplexing of the antenna elements. That is, the six antenna elements 621, 622, 623, 624, 625, and 626 can radiate the dual beam or the third beam, such as the 65° beam, thereby reducing the number of antenna elements and reducing the cost of the antenna elements. Those skilled in the art should understand that the at least three antenna elements can be arranged in one or more rows. A difference between FIG. 5 and FIG. 6 is that the feed network of the antenna shown in FIG. 6 includes two power dividers 642 and 644. The input of the two power dividers 642 and 644 includes the third beam signal (i.e., the signal used to form the 65° beam shown in FIG. 6). The output terminals of the two power dividers 642 and 644 are connected to the first input terminal (the input terminal on the right side of each of the diplexers shown in FIG. 6) of the six diplexers 631, 632, 633, 634, 635, and 636. In an example embodiment of the present disclosure, the six diplexers 631, 632, 633, 634, 635, and 636 are arranged between the power dividers 641, 642, 643, and 644 and the six antenna elements 621, 622, 623, 624, 625 and 626.

Similar to the principle of FIG. 4, in order to enable multiple antenna elements to be multiplexed, two diplexers can also be used. FIG. 7 is a schematic diagram of an antenna 700 for radiating a dual beam and a third beam, such as a 65° beam, according to an example embodiment of the present disclosure. As shown in FIG. 7, the antenna 700 includes an antenna element array for forming a dual beam. The antenna element array includes six antenna elements 721, 722, 723, 724, 725, and 726.

A phase difference of the adjacent two antenna elements of the at least three first antenna elements 721, 722, and 723 is a first angle, and a phase difference of the adjacent two antenna elements of the at least three second antenna elements 724, 725, and 726 is a second angle. In an example embodiment of the present disclosure, a length of a cable between a power divider 741 and each of the first antenna elements 721, 722, and 723 of a first antenna element group and/or an internal structure of the power divider 741 is related with the first angle $\Delta P$. The length of the cable between a power divider 742 and each of the second antenna elements 724, 725, and 726 of a second antenna element group and/or the internal structure of the power divider 742 is related to the second angle $\Delta P$. Phases of the antenna elements 721, 722, and 723 are, for example, $-2\Delta P$, $-1\Delta P$, and $0\Delta P$, respectively. Phases of the antenna elements 724, 725, and 726 are, for example, 0 degree, $-\Delta P$, and $-2\Delta P$, respectively. In an example embodiment of the present disclosure, the first angle or the second angle is in a range of 0 degree to 150 degrees. In an example embodiment of the present disclosure, the first angle or the second angle is 90 degrees.

In addition, a feed network of the antenna 700 includes two diplexers 731 and 732. Each of the two diplexers 731 and 732 includes a first input terminal, a second input terminal, and an output terminal (a terminal of the diplexer connected to input terminals of the corresponding power dividers 741 and 742 shown in the FIG. 7). The two diplexers 731 and 732 are electrically connected to the corresponding input terminals of the power dividers 741 and 742 through the output terminals, respectively. The two diplexers 731 and 732 are configured to process a dual beam signal (i.e., a signal used to form beam 1 or beam 2 shown in FIG. 7) and a signal associated with a third beam signal (i.e., a signal used to form the 65° beam shown in FIG. 7) that works in a different frequency band, to obtain a combined signal including a signal component associated with the signal used to form beam 1 or beam 2 of the dual-beam signal and another signal component associated with the third beam signal. Thus, the combined signal can be radiated by the antenna element (e.g., the six antenna elements 721, 722, 723, 724, 725, and 726 shown in FIG. 7) electrically connected to the two diplexers 731 and 732. With the aid of the two diplexers 731 and 732, the combined signal including the signal component associated with the dual-beam signal (i.e., the signal used to form beam 1 or beam 2 shown in FIG. 7) and the another signal component associated with the third beam signal (i.e., the signal used to form the 65° beam shown in FIG. 7) can be radiated through, for example, a same antenna element, thereby realizing the multiplexing of the antenna elements. That is, the six antenna elements 721, 722, 723, 724, 725, and 726 can radiate both a dual beam and a third beam, such as a 65° beam, thereby reducing the number of antenna elements and reducing the cost of the antenna elements. Those skilled in the art should understand that the at least three antenna elements can be arranged in one or more rows. As shown in FIG. 7, the antenna 700 further includes a power divider 750. The input of the power divider 750 includes the signal used to form the third beam (i.e., the signal used to form the 65° beam shown in FIG. 7). The output terminal of the power divider 750 is connected to the first input terminal of the two diplexers 731 and 732 (the input terminal of each of the diplexers 731 and 732 on the right side shown in FIG. 7). In an example embodiment of the present disclosure, the two diplexers 731 and 732 are arranged between the power divider 741, the power divider 742, and the power divider 750, respectively. In addition, in the example shown in FIG. 7, the input of the second input terminal of the two diplexers 731 and 732 (the input terminal of each of the diplexers 731 and 732 on the left side shown in FIG. 7) includes the signal used to form beam 1 and the signal used to form beam 2, respectively.

In some embodiments, the antennas shown in FIGS. 5 to 7 can further include a third antenna element group including at least three third antenna elements arranged in a row, and a fourth antenna element group including at least three fourth antenna elements arranged in a row. The number of the first antenna elements is equal to the number of the third antenna elements. Each of the at least three third antenna elements and the corresponding first antenna element are staggered in a direction perpendicular to an arrangement direction of the first antenna element group. The number of the second antenna elements is equal to the number of the fourth antenna elements. Each of the at least three fourth antenna elements and the corresponding second antenna element are staggered in the direction perpendicular to the arrangement direction of the second antenna element group. In an example embodiment of the present disclosure, the feed network of the antenna further includes a third feed network and a fourth feed network. The third feed network includes a third power divider and a third cable group used to electrically connect the third power divider to each of the third antenna elements of the third antenna element group. The internal structure of the third power divider and/or the length of each cable of the third cable group is configured to adjust the phase of the signal used to form the first beam and received by each of the third antenna elements in each of the third antenna elements. In addition, the fourth feed network further includes a fourth power divider and a fourth cable group used to electrically connect the fourth power divider to each of the fourth antenna elements of the fourth antenna element group. The internal structure of the fourth power divider and/or the length of each cable of the fourth cable group is configured to adjust the phase of the signal used to form the second beam and received by each of the fourth antenna elements in each of the fourth antenna elements. The third feed network and the fourth feed network are independent from each other. In an example embodiment of the present disclosure, the phase difference of the two adjacent third antenna elements of the third antenna element group is a third angle. The phase difference of the two adjacent fourth antenna elements of the fourth antenna element group is a fourth angle. In an example embodiment of the present disclosure, the length of each cable of the third cable group and/or the internal structure of the third power divider is related to the third angle. The length of each cable of the fourth cable group and/or the internal structure of the fourth power divider is related to the fourth angle. In an example embodiment of the present disclosure, the first angle is equal to the third angle, and the second angle is equal to the fourth angle. In an example embodiment of the present disclosure, the first angle, the second angle, the third angle, and the fourth angle are all equal.

In summary, with the aid of the first diplexer, the combined signal including the first signal component associated with the dual beam signal and the second signal component associated with the third beam signal can be radiated through, for example, a same antenna element, thereby realizing the multiplexing of the antenna element. That is, the antenna element can radiate both a dual beam and a third beam, such as a 65° beam, thereby reducing the number of antenna elements and reducing the cost of the antenna element.

Other embodiments of the disclosure will be apparent to those skilled in the art from consideration of the specification and practice of the embodiments disclosed herein. In addition, the method of the present disclosure can be implemented either in a manner of software using appropriate processor instructors or in a hybrid manner using a combination of a hardware logic and a software logic. It is intended that the specification and examples be considered as example only and not to limit the scope of the disclosure, with a true scope and spirit of the invention being indicated by the following claims.

What is claimed is:

1. An antenna comprising:
   an antenna element array configured to form a dual beam and including at least three antenna elements; and
   a feed network including:
      a first signal input terminal configured to input a first beam signal for forming a first beam;
      a second signal input terminal configured to input a second beam signal for forming a second beam;
      a third signal input terminal configured to input a third beam signal for forming a third beam; and
      a diplexer including a first input terminal, a second input terminal, and an output terminal;
   wherein, the diplexer is electrically connected to at least one antenna element in the antenna element array through the output terminal, and is configured to process a signal associated with a dual-beam signal and a signal associated with the third beam signal working in a different frequency band from the dual-beam signal, to obtain a combined signal, and to enable the at least one antenna element electrically connected to the first diplexer to radiate the combined signal, the dual-beam signal including at least one of the first beam signal or the second beam signal, and the combined signal including a first signal component associated with the dual-beam signal and a second signal component associated with the third beam signal.

2. The antenna of claim 1, wherein the third beam signal includes a signal for forming a 65° beam.

3. The antenna of claim 1, wherein the feed network of the antenna further includes an electric bridge.

4. The antenna of claim 3, wherein the diplexer is arranged between the electric bridge and the at least one antenna element.

5. The antenna of claim 4, wherein:
   the first input terminal of the diplexer is connected to the electric bridge;
   an input of the second input terminal of the diplexer includes the third beam signal; and
   an input of the electric bridge includes the first beam signal and the second beam signal.

6. The antenna of claim 3, wherein:
   the antenna further includes a power divider;
   an input of the power divider includes the third beam signal; and
   an output terminal of the power divider is connected to the first input terminal of the diplexer.

7. The antenna of claim 6, wherein:
   the diplexer is arranged between the electric bridge and the at least one antenna element;
   the second input terminal of the diplexer is connected to the electric bridge; and
   an input of the electric bridge includes the first beam signal and the second beam signal.

8. The antenna of claim 6, wherein an input of the second input terminal of the diplexer includes the first beam signal.

9. The antenna of claim 8, wherein:
   the diplexer is a first diplexer, and the antenna further includes a second diplexer including a first input terminal, a second input terminal and an output terminal;
   an input of the second input terminal of the second diplexer includes the second beam signal; and
   an input of the first input terminal of the second diplexer includes an output of the power divider.

10. The antenna of claim 9, wherein the electric bridge is arranged between the at least one antenna element and the first diplexer, and between at least another antenna element and the second diplexer, and the input of the electric bridge includes the output of the first diplexer and the second diplexer.

11. The antenna of claim 1, wherein:
   the antenna element array further includes:
      a first antenna element group including at least three first antenna elements arranged in a row; and
      a second antenna element group including at least three second antenna elements arranged in a row;
      wherein the antenna elements in the first antenna element group and the second antenna element group are independent from each other; and
   the feed network further includes:
      a first feed network including a first power divider and a first cable group configured to electrically connect the first power divider to each of the first antenna elements of the first antenna element group, the first power divider and/or the first cable group being configured to adjust a phase of a signal for forming the first beam in each of the first antenna elements; and a second feed network including a second power divider and a second cable group configured to electrically connect the second power divider to each of the second antenna elements of the second antenna element group, the second power divider and/or the second cable group being configured to adjust a phase of a signal for forming the second beam in each of the second antenna elements;

wherein the first feed network and the second feed network are independent from each other.

12. The antenna of claim 11, wherein the antenna element array further includes:
a third antenna element group including at least three third antenna elements arranged in a row, a number of the first antenna elements being equal to a number of the third antenna elements, and each of the at least three third antenna elements and a corresponding first antenna element being staggered in a direction perpendicular to a row direction of the first antenna element group; and
a fourth antenna element group including at least three fourth antenna elements arranged in a row, a number of the second antenna elements being equal to a number of the fourth antenna elements, and each of the at least three fourth antenna elements and a corresponding second antenna element being staggered in a direction perpendicular to a row direction of the second antenna element group.

13. The antenna of claim 12, wherein the feed network further includes:
a third feed network including a third power divider and a third cable group configured to electrically connect the third power divider to each of the third antenna elements of the third antenna element group, the third power divider and/or the third cable group being configured to adjust a phase of a signal for forming the first beam in each of the third antenna elements; and
a fourth feed network including a fourth power divider and a fourth cable group configured to electrically connect the fourth power divider to each of the fourth antenna elements of the fourth antenna element group, the fourth power divider and/or the fourth cable group being configured to adjust a phase of a signal for forming the second beam in each of the fourth antenna elements;

wherein the third feed network and the fourth feed network are independent from each other.

14. The antenna of claim 11, wherein:
a phase difference of two adjacent first antenna elements of the first antenna element group is a first angle; and
a phase difference of two adjacent second antenna elements of the second antenna element group is a second angle.

15. The antenna of claim 14, wherein:
a length of each cable of the first cable group and a structure of the first power divider are related to the first angle; and
a length of each cable of the second cable group and a structure of the second power divider are related to the second angle.

16. The antenna of claim 13, wherein:
a phase difference of two adjacent first antenna elements of the first antenna element group is a first angle;
a phase difference of two adjacent second antenna elements of the second antenna element group is a second angle;
a phase difference of two adjacent third antenna elements of the third antenna element group is a third angle;
a phase difference of two adjacent fourth antenna elements of the fourth antenna element group is a fourth angle;
the first angle is equal to the third angle; and
the second angle is equal to the fourth angle.

17. The antenna of claim 16, wherein the first angle, the second angle, the third angle, and the fourth angle are all equal.

* * * * *